United States Patent
Koh et al.

(10) Patent No.: US 7,715,732 B2
(45) Date of Patent: May 11, 2010

(54) BIAS-CONTROL FOR OPTICAL MACH-ZEHNDER MODULATORS WITH VOLTAGE-INDUCED OPTICAL ABSORPTION

(75) Inventors: Ping-Chiek Koh, Goleta, CA (US); Michael C. Larson, Santa Barbara, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 636 days.

(21) Appl. No.: 11/571,872

(22) PCT Filed: Aug. 5, 2005

(86) PCT No.: PCT/US2005/027920

§ 371 (c)(1),
(2), (4) Date: Jan. 9, 2007

(87) PCT Pub. No.: WO2006/137828

PCT Pub. Date: Dec. 28, 2006

(65) Prior Publication Data

US 2008/0094123 A1    Apr. 24, 2008

Related U.S. Application Data

(60) Provisional application No. 60/598,938, filed on Aug. 5, 2004.

(51) Int. Cl.
*H04B 10/04* (2006.01)
*H04B 10/00* (2006.01)

(52) U.S. Cl. ............ 398/194; 398/158; 398/159; 398/162; 398/192; 398/198; 398/200; 398/201; 359/237; 359/245; 359/249; 385/1; 385/2; 385/3

(58) Field of Classification Search ............... 398/198, 398/158, 159, 162, 192, 193, 194, 200, 201; 359/237, 245, 249; 385/1, 2, 3
See application file for complete search history.

(56) References Cited

U.S. PATENT DOCUMENTS

| | | | |
|---|---|---|---|
| 6,222,965 B1 | 4/2001 | Smith | 385/40 |
| 6,654,534 B1* | 11/2003 | Prosyk et al. | 385/131 |
| 7,369,290 B1* | 5/2008 | Cox et al. | 359/239 |
| 2004/0027634 A1 | 2/2004 | Bond et al. | 359/240 |

* cited by examiner

*Primary Examiner*—Ken N Vanderpuye
*Assistant Examiner*—Daniel G Dobson
(74) *Attorney, Agent, or Firm*—Matthew A. Pequignot; Pequignot + Myers LLC (57) ABSTRACT

A bias-control circuit that provides operating point control for a Mach-Zehnder modulator experiencing optical absorption at their interferometric arms. The bias control circuit generates compensation signals that are used to counter the thermally induced index shifts as a result of absorption. In addition, an operating point with desirable transmitter characteristics can also be arbitrarily chosen by over-compensating or under-compensating thermal effects.

22 Claims, 7 Drawing Sheets

BIAS-CONTROL FOR OPTICAL MACH-ZEHNDER MODULATORS WITH VOLTAGE-INDUCED OPTICAL ABSORPTION

CROSS-REFERENCE TO RELATED APPLICATIONS

This application claims the benefit under 35 U.S.C. Section 119(e) of the following co-pending and commonly-assigned U.S. patent application:

U.S. Provisional Patent Application Ser. No. 60/598,938, filed on Aug. 5, 2004, by Ping-Chiek Koh, entitled "BIAS-CONTROL FOR OPTICAL MACH-ZEHNDER MODULATORS WITH VOLTAGE-INDUCED OPTICAL ABSORPTION,";

which application is incorporated by reference herein.

STATEMENT REGARDING FEDERALLY SPONSORED RESEARCH AND DEVELOPMENT

This invention was made with Government support under contract W31P4Q-04-C-R072 awarded by the U.S. Army Aviation and Missile Command. The Government has certain rights in the invention.

BACKGROUND OF THE INVENTION

1. Field of the Invention

This invention relates generally to Mach-Zehnder modulators, and more particularly, to a bias-control for optical Mach-Zehnder modulators with voltage-induced optical absorption.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Mach-Zehnder modulators (MZMs) operate by modulating the optical phase difference between two waveguides, which then interfere constructively or destructively to achieve an amplitude modulation (AM) on the output. They have traditionally been made from lithium niobate ($LiNbO_3$) materials.

These $LiNbO_3$ MZMs have been a vital component in modern optical communications systems. These modulators, in various configurations, are able to show good transmitter performance, such as high extinction ratios, low insertion loss, high bandwidth and low transient chirp. These desirable characteristics have led to wide scale deployment of $LiNbO_3$ MZMs in both analog and digital optical communications systems.

However, to maintain good transmitter performance, the phase difference between the two waveguides must be precisely controlled in order to counteract the effects of environmental changes or component aging. Thus, a bias control loop is required to counteract slowly-varying changes in the average phase difference. The bias control loop generates a direct current (DC) compensation signal that keeps the MZM operating about a quadrature point on its transfer characteristics.

DC bias control loop designs for $LiNbO_3$ MZMs are well established in prior art. The control loop typically takes the form of a low-frequency AM dither of the radio frequency (RF) drive signal for the MZM, sensing of that narrow-band frequency component on the output, and adjusting DC bias to keep the low frequency output signal at zero.

With ever increasing demand for capacity, there is a need to reduce cost, power consumption and footprints of all components. Co-packaging laser and modulator into a single package works well in reducing both the footprint and the cost of the transmitter, but further reduction in size and power consumption can only be achieved through monolithic integration of both laser and modulator [1,2]. This potential has led to the development of semiconductor MZMs, such as indium phosphide (InP)-based MZMs.

Figure 1:
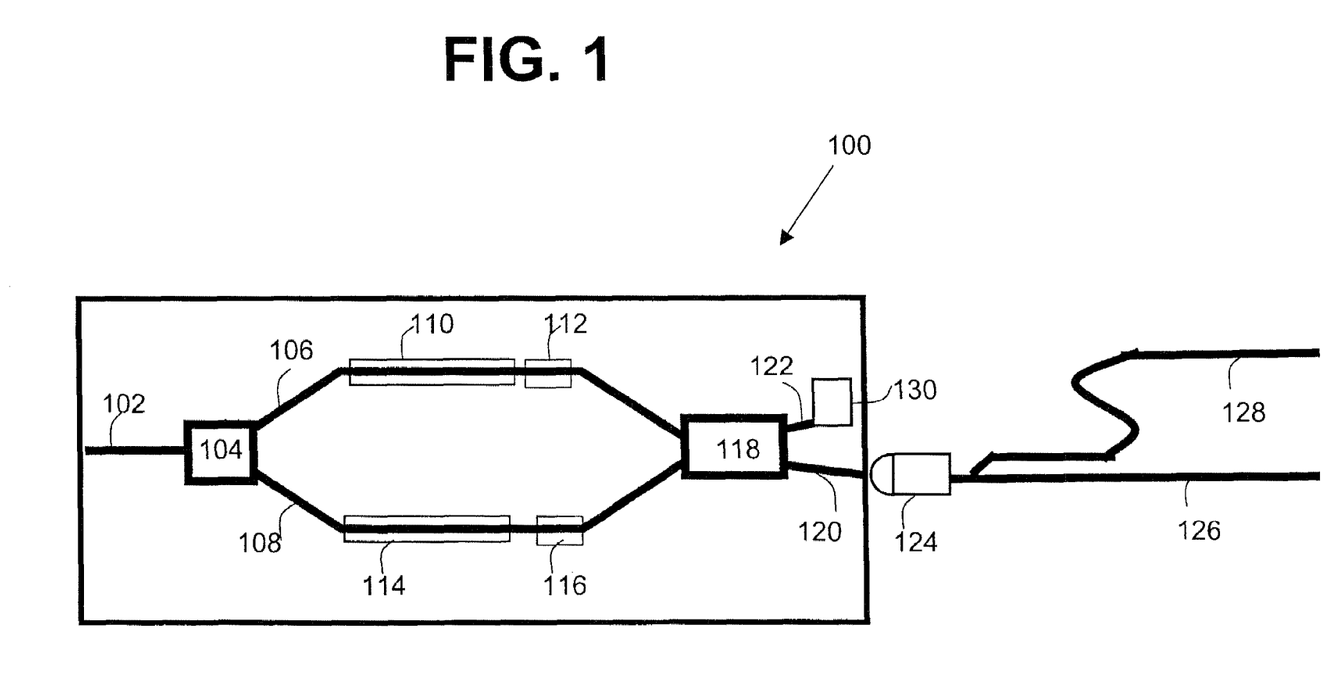
FIG. 1 is a block diagram of a typical semiconductor Mach-Zehnder modulator.

FIG. 1 is a block diagram of a typical semiconductor MZM 100 that includes an optical input 102, a 1×2 multimode interference (MMI) coupler 104, two modulator arms 106, 108 with either 0° or 180° (PI) phase delays or shifts, respectively, relative to each other, an M0 (0°) electrode 110 on arm 106, an M0-phase (0°) electrode 112 on arm 106, an MP (180°) electrode 114 on arm 108, an MP-phase (180°) electrode 116 on arm 108, and a 2×2 MMI coupler 118, which is the output of the MZM 100. The two outputs 120, 122 of the 2×2 MMI coupler 118 are called DATA 120 and DATABAR_TAP 122. The DATA output 120 is fiber-coupled by a collimating lens 124 to one or more output fibers 126, as well as an optical tap 128, while the DATABAR_TAP output 122 is coupled to a power tap photodiode 130. By applying a voltage on one of the modulator arms 106,108, the phase difference between the two optical waves that propagate through the arms 106, 108 is altered through the electro-optic effect, and this is converted to intensity variations as a result of interference at the output. This results in a theoretical sinusoidal electrical-to-optical (E/O) transfer function in which MZM 100 operates at the quadrature (differential phase of PI/4) point when used as an intensity modulator.

As noted above, to maintain consistent transmitter characteristics over an extended period of time, a MZM control loop is typically required to counter various effects such as drifts, aging of components and temperature variations that prevent the MZM from always operating at the quadrature point. The use of a control loop in MZM is critical and the schemes for controlling a $LiNbO_3$ MZM can broadly be divided into two categories:

(a) Distortion-based $LiNbO_3$ MZM control that seeks to minimize the ratio of even order terms ($2^{nd}$ order typically) to the fundamental, resulting in the MZM always operating at quadrature point of the E/O transfer function [3, 4]. This control scheme uses the fact that at quadrature point, the Taylor's series expansion has non-zero odd order terms with all even order terms identically zero. A typical implementation uses a small amplitude dither signal at frequency $F_m$ applied to the bias voltage. A photodetector is used to provide optical-to-electrical conversion and to detect small variations in optical power as a result of the dither signal. The amplitudes of the fundamental (at frequency $F_m$) and $2^{nd}$ order (at frequency $2 \times F_m$) components of the detected signal are measured. The control scheme seeks to change the bias voltage such that the ratio of $2^{nd}$ order to fundamental of the monitored signal is minimized.

(b) MZM bias-control based on amplitude modulation of a RF drive signal [5]. This control scheme uses the symmetrical property of the sinusoidal E/O transfer function, such that the slopes at any two points equidistant from a quadrature operating point are equal. Thus, an Amplitude Modulation (AM) electrical input signal at quadrature operating point will result in minimum amplitude detected at the AM frequency ($F_m$ Hz), since the out-of-phase AM modulations at the optical-one level and optical-zero level cancel each other given the symmetric nature at the quadrature point. A typical implementation applies a low frequency dither $F_m$ Hz on the gain control of the RF amplifier driver of the MZM. The optical signal is tapped off and detected using a photodetector and, upon optical-to-electrical conversion, the amplitude at $F_m$ Hz is measured. The control scheme seeks to change the operating point such that the detected signal is at a minimum, as any deviation from the quadrature point will result in increase in the amplitude detected, since AM at the optical levels no longer results in perfect cancellations.

The major difference between a $LiNbO_3$-based MZM and that of a semiconductor-based MZM is that, in a semiconductor MZM, the voltage induced phase shifts are accompanied by electro-absorption. This absorption of optical waves is usually non-linear with voltage and results in the heating of the MZM arm.

Thus, the semiconductor MZM differs from the $LiNbO_3$ MZM in two major ways:

(1) The E/O transfer function no longer corresponds to the usual sinusoidal function.

(2) The electro-absorption results in a photocurrent and hence heating of the MZM arm. This causes thermally-induced optical index shifts, which complicates the operation and control of the semiconductor MZM.

The implications of (1) and (2) are that control schemes based on (a) and (b) described above will have difficulty in generating suitable control signals that can be used to bias the semiconductor MZM for proper operation.

In the case of (a), the half-power point of the E/O transfer and the point with maximum slope efficiency no longer coincide with each other, requiring modifications to control schemes that minimize the ratio of $2^{nd}$ order to fundamental harmonics. Depending on the frequency of the dither signal, the control scheme also has to deal with any additional influence as a result of thermally induced index shifts.

Figure 2:
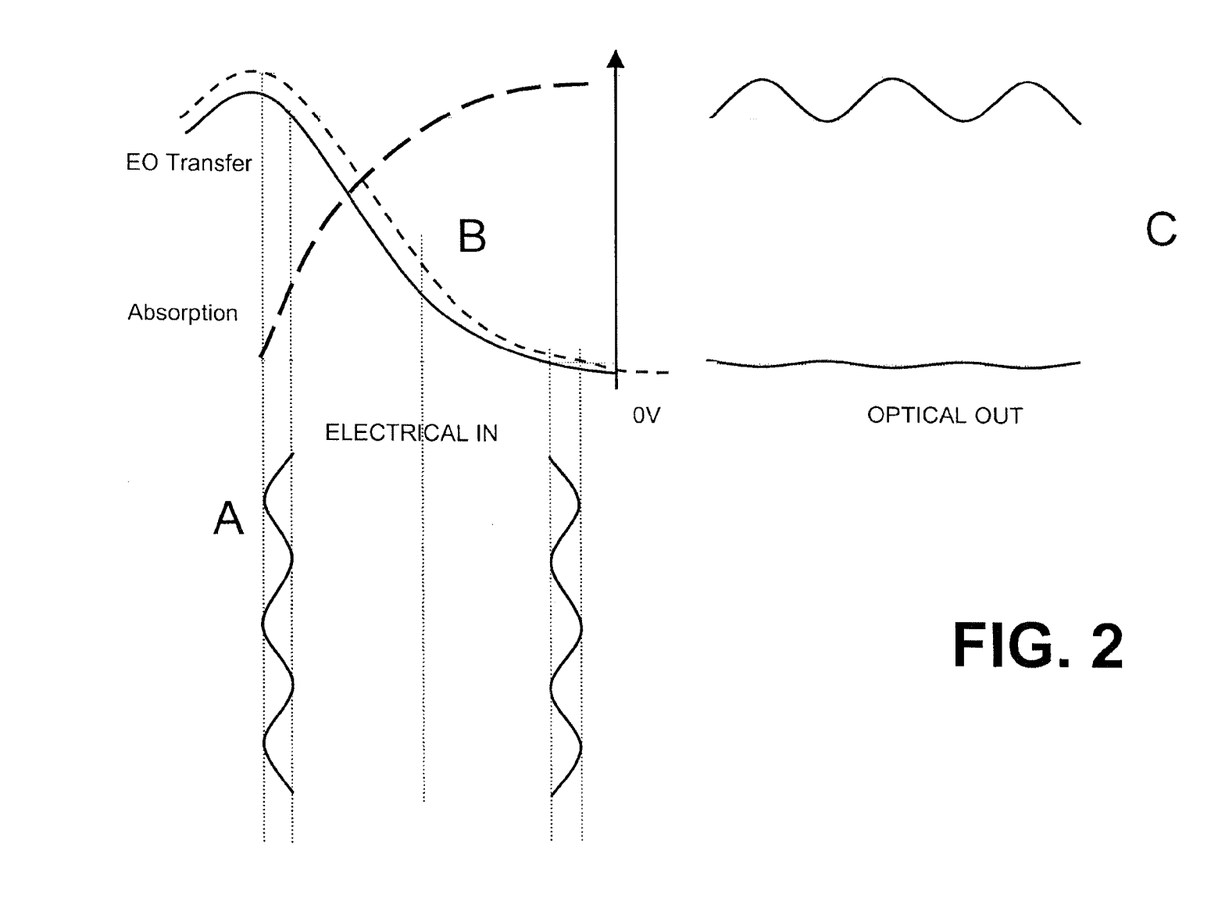
FIG. 2 shows in the presence of optical electro-absorption, a single-sided AM optical output is produced with double-sided AM modulated electrical input signal, using a PI-phase-shifted MZM as an example.

For (b), the thermal index shifts have been shown experimentally to result in a single-sided AM optical output for a reasonable range of extinction ratios. FIG. 2 illustrates the physics of why a single-sided AM optical output is produced, in the presence of optical electro-absorption, using a PI phase shifted semiconductor MZM as an example. In FIG. 2, A is a plot of electrical input, B is a plot of the E/O transfer and electro-absorption versus input voltage, and C is a plot of the optical output with electrical input A. With an amplitude-modulated drive signal shown in A of FIG. 2, in addition to modulating the optical power amplitude, is also modulating the thermally induced index shift as a consequence of absorption, particularly at the voltage that corresponds to a high absorption slope. This thermally induced index shift shifts the transfer curve of the modulator, displacing it in an out-of-phase fashion with respect to the amplitude-modulated drive signal at the high absorption slope region. The out-of-phase transfer curve displacement now tracks the amplitude-modulated drive signal at the low absorption end, canceling or significantly reducing the optical amplitude modulations, thus resulting in a one-sided AM modulated output in which the tapped-off and E/O converted signal will no longer show any minimum signal for the control loop to lock to. This effect is shown in B and C in FIG. 2.

As a result, there is a need for improved control of semiconductor MZMs. Specifically, there is a need for control schemes that prevent bias control loops from erroneously controlling to the wrong operating point due to distortion of the normally sinusoid transfer characteristic. Furthermore, there is a need for control schemes that prevent the heating that is accompanied by optical absorption from causing the control loop to fail to bias the semiconductor MZM at the desired operating point, because the thermal and amplitude modulation effects destructively interfere with each other. The present invention satisfies this need.

SUMMARY OF THE INVENTION

The present invention is a bias control circuit that provides an operating point control for Mach-Zehnder modulators experiencing optical absorption at their interferometric arms. The bias control circuit generates compensation signals that are used to counter thermally induced optical index shifts as a result of the absorption. In addition, an operating point with desirable transmitter characteristics can also be arbitrarily chosen by over-compensating or under-compensating the thermal effects. This technique is applicable to Mach-Zehnder modulators with or without absorption.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention is an improved control scheme for semiconductor MZMs in the presence of electro-absorption. The improved control scheme includes the use of an AM drive signal as the electrical input to the semiconductor MZM and two additional compensation signals generated by the bias control scheme.

The first compensation signal, which is a direct current (DC) compensation signal, compensates for the average thermally induced index shifts as a result of the DC component of the electrical input. The second compensation signal, which is an alternating current (AC) compensation signal, specifically compensates for the instantaneous thermal index shifts as a result of the AM component of the electrical input, as explained in FIG. 2. The AC compensation signal, as a consequence, has identical frequency and is either in-phase or out-of-phase with the AM component, depending on the type of MZM, the arm in which the AC compensation signal is applied, and the slope of the gain control of the amplifier driver for the MZM. In addition, the frequency of the AC compensation signal has to be slower than that the thermal time-constant of the MZM.

The DC compensation signal is applied to a first arm of the MZM, while the AC compensation signal is a sinusoidal signal applied to the either the first or the second arm of the MZM, wherein the AC compensation signal nulls out the effect of heating due to optical absorption. The amplitude of the AC compensation signal is proportional to the average photocurrent produced in the first arm, wherein a proportionality constant is determined through calibration. Furthermore, the proportionality constant can be calibrated to compensate for a distorted (nonsinusoidal) transfer curve, in addition to compensating for thermal effects. In other words, the proportionality constant allows our control scheme to operate away from the quadrature point, which may be needed to optimize other transmission related parameters (e.g., chirp). As shown in the next sections, the combination of AC and DC compensation signals will result in proper generation of an error signal suitable for the bias point control of the MZM in the presence of optical electro-absorption.

Figure 3A:
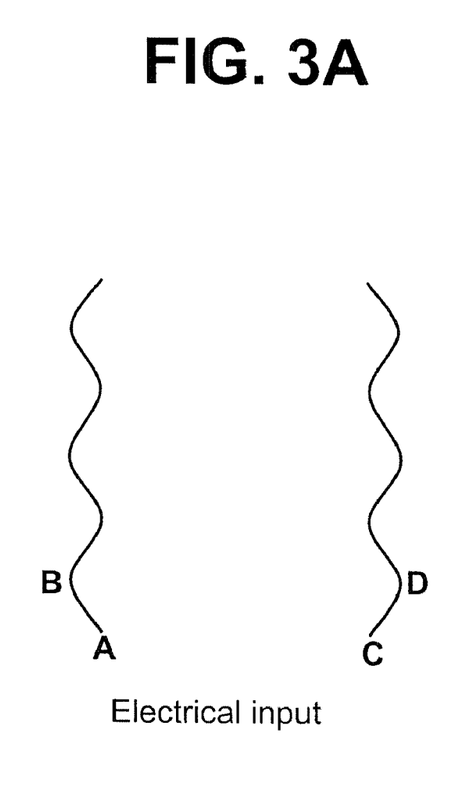
FIG. 3A is a diagram of an amplitude modulated electrical input and FIG. 3B is a phasor diagram at the output of a PI-phase-shifted Mach-Zehnder modulator, illustrating how the use of an AC compensating signal counteracts the thermal-induced index shifts and results in a double sided AM optical output.
Figure 3B:
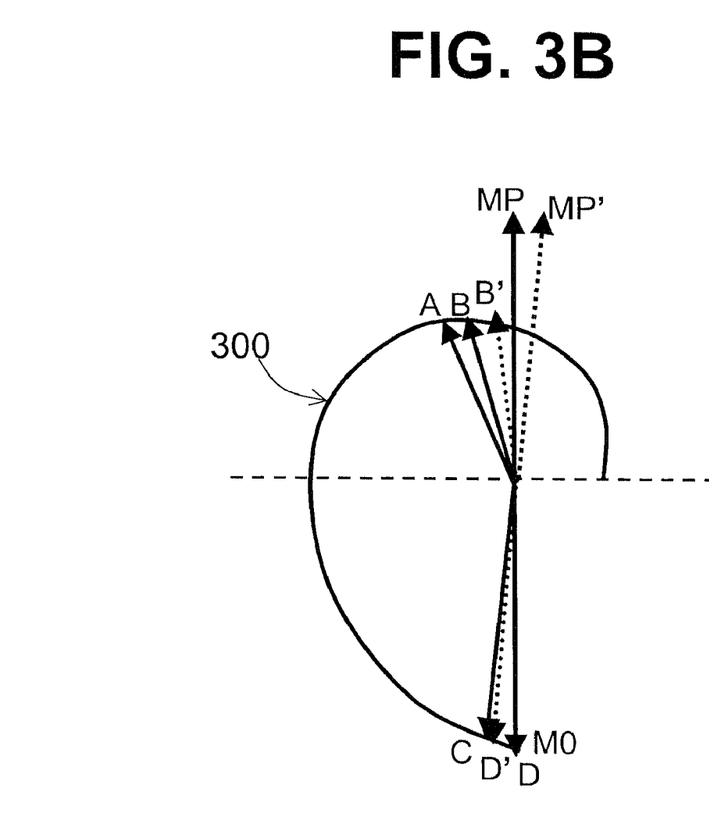

FIG. 3 illustrates the working principles of the present invention, using a phasor diagram of a PI-phase-shifted MZM as an example. FIG. 3A is a diagram of the AM electrical input and FIG. 3B is a phasor diagram at the output of the MZM and the effect of an AC compensation signal. The diagrams of FIGS. 3A and 3B are intentionally drawn in such a way as to illustrate the principles of the present invention, showing a phase transversal of less than PI and with a high AM index for the electrical input, and after the compensation of average thermally induced index shifts (provided by the DC compensation signal). The phasor labeled M0 represents the electric field of the optical wave traversing the M0 arm, which in this case is the arm where the modulating signal is applied. The phasor labeled MP represents the electric field of the optical wave traversing the MP arm where it accumulates additional PI phase shift with respect to the M0 arm. Also shown in the diagram is the amplitude trajectory 300 that the electric field will transverse when voltage is applied to the M0 arm. This trajectory 300 is of decreasing amplitude as a result of voltage-induced optical absorption.

The compensation of the average thermal component (DC compensation signal) is straightforward and will not be explained further.

The points (A), (B), (C) and (D) are labeled on the AM input shown in FIG. 3A and their corresponding phasors are shown in FIG. 3B. The effect of thermal index shifts as a result of voltage transitions from (A) to (B) (or corresponding from (C) to (D)), is that the phasors (B) and (D) are transitioned to (B') and (D'), respectively. It can be seen in FIG. 3B that the MZM optical output has single-sided AM as phasors (C) and (D') almost coincide with each other, while B' and A are not. The AC compensation signal used in the MZM control scheme compensates these thermal index shifts by means of either moving (D') back to (D), or, rotating phasor (MP) to (MP') such that the angle between (B) and (MP) is equal to (B') and (MP') at all times. The former corresponds to applying the compensation signal in the same arm as the M0, while the latter is equivalent to applying the compensation signal in the MP arm. Both will achieve the same result of producing a double sided AM optical output.

Figure 4:
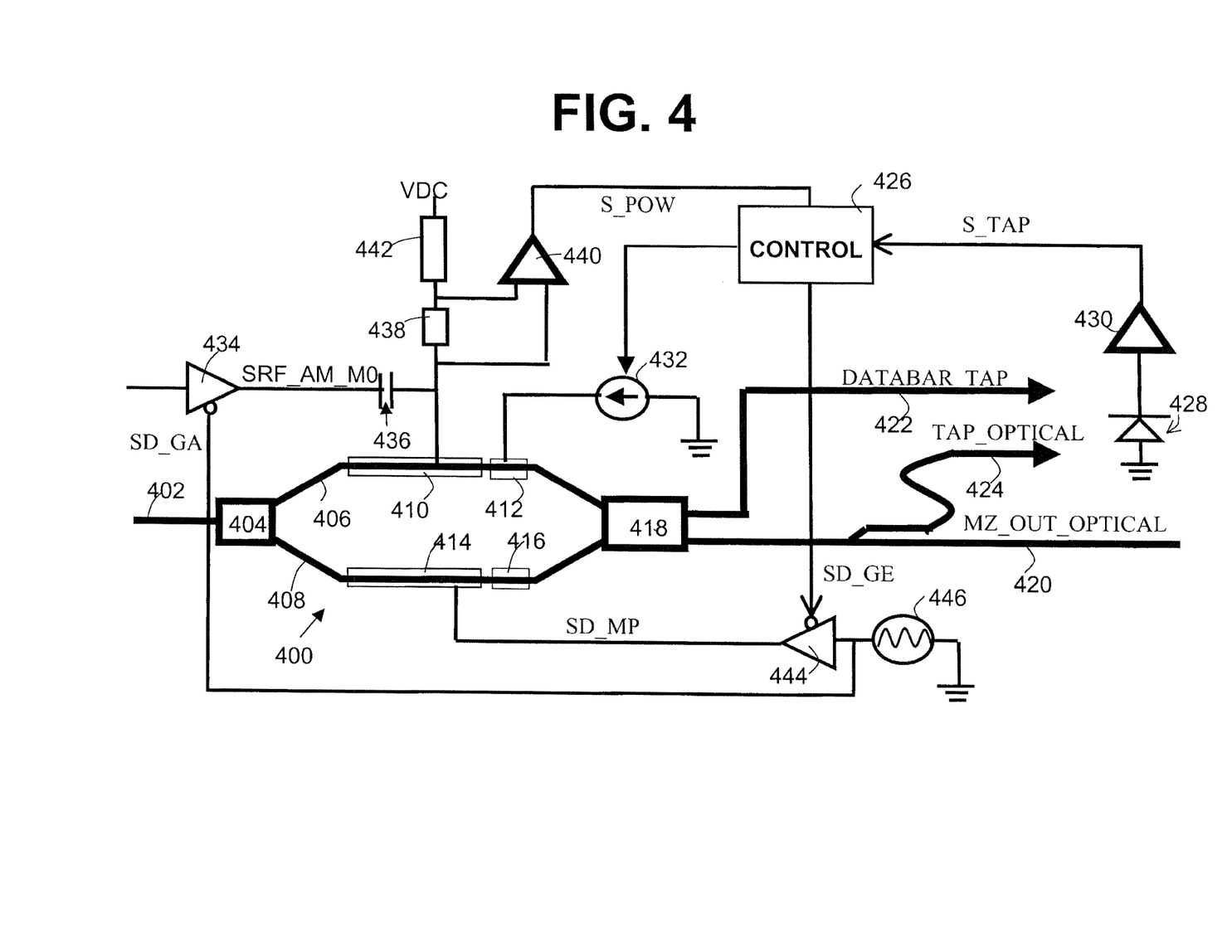
FIG. 4 is a block diagram used to illustrate the control schemes for a PI-phase-shifted Mach-Zehnder modulator according to the preferred embodiment of the present invention.

FIG. 4 is a block diagram used to illustrate the control schemes for a PI-phase-shifted MZM 400 according to the preferred embodiment of the present invention. The MZM 400 includes an optical input 402, a 1×2 multimode interference (MMI) coupler 404, two modulator arms 406, 408 with either 0° or 180° (PI) phase delays or shifts, respectively, relative to each other, an M0 electrode 410 on arm 406, an M0-phase electrode 412 on arm 406, an MP electrode 414 on arm 408, an MP-phase electrode 416 on arm 408, and a 2×2 MMI coupler 418, which is the output of the MZM 400. The two outputs 420, 422 of the 2×2 MMI coupler 418 are called MZ_OUT_OPTICAL 420 and DATABAR_TAP 422. The MZ_OUT_OPTICAL 420 is also optically tapped to an output called TAP_OPTICAL 424.

The control schemes for the MZM 400 are implemented in a bias control circuit that generates compensation signals that are used to counter thermally induced index shifts as a result of the MZM 400 experiencing optical absorption at its interferometric arms 406, 408, wherein an operating point with desirable transmitter characteristics is arbitrarily chosen for the MZM 400 by over-compensating or under-compensating thermal effects. The bias control circuit is a control loop that includes a controller 426, photodetector 428, amplifier 430, current source 432, RF modulator driver 434, capacitor 436, photocurrent sense resistor 438, amplifier 440, bias tee inductor 442, amplifier 444 and oscillator 446. The operation of the bias control circuit is described in more detail below.

The control schemes use an AM RF input signal, with DC and AC compensation injected at the M0-phase electrode 412 and the MP electrode 414, respectively. Specifically, the bias control circuit generates a first compensation signal that is a direct current (DC) compensation signal that compensates for the thermally induced index shifts as a result of a DC component of an electrical input signal and a second compensation signal that is an alternating current (AC) compensation signal that compensates for the thermally induced index shifts as a result of an amplitude modulation (AM) component of the electrical input, wherein the DC compensation signal is applied to a first arm 406 or 408 of the MZM 400, while the AC compensation signal is a sinusoidal signal applied to the second arm 406 or 408 of the MZM 400.

As a result, the following control schemes may be used:

(1) The AM RF input signal, labeled as SRF_AM-M0, is applied either at the M0 electrode 410, the MP electrode 414, or at both the M0 electrode 410 and MP electrode 414.

(2) A DC compensation signal, labeled as $I_{PH}$, is applied either at the MP electrode 414, the MP phase electrode 416, or the M0 phase electrode 412.

(3) An AC compensation signal, labeled as SD_MP, is applied either at the MP electrode 414, the MP phase electrode 416, the M0 phase electrode 412, or the M0 electrode 410. Preferably, the AC compensation signal has identical frequency and is either in-phase or out-of-phase with the AM component of the electrical input, and the amplitude of the AC compensation signal is proportional to an average photocurrent produced in the first arm 406 or 408 of the MZM 400. The phasing of the AC compensation signal has to be performed in such a way that it counteracts the thermal index shifts.

As an illustration of the present invention, three electrodes of the MZM 400 are used as follows:

(a) M0-phase electrode 412. As noted above, the DC compensation signal $I_{PH}$ is applied to this electrode 412. The average thermal index shifts as a result of information bearing signal SRF_AM_M0 imposed on the M0 electrode 410 are tuned out by current injection into this electrode 412 through decreasing the refractive index. The operating point in which to operate the MZM 400 is controlled by changing the current, $I_{PH}$, injected into this electrode 412 by a controlled current source 432.

(b) M0 electrode 410. As noted above, the information-bearing AM RF input signal SRF_AM_M0 is injected at this electrode 410. In the control scheme of the present invention, a low frequency ($F_m$=0.1-10 kHz) voltage dither signal (which is supplied by oscillator 446) is applied to the gain of the RF modulator driver 434 to produce an AM drive signal, which is subsequently DC filtered by capacitor 436. A typical electrical AM index of around 5% or less should be adequate for this purpose.

(c) MP electrode 414. As noted above, the AC compensation signal SD_MP is injected into this electrode 414. The MP electrode 414 is the second modulator electrode 414 at the arm 408, wherein optical waveforms accumulate either a zero phase shift (in a conventional MZM 400) or an extra PI phase shift (in a PI-phase-shifted MZM 400), relative to the M0 arm 406. SD_MP is a voltage dither signal that is derived from amplifier 444 and oscillator 446, and then applied at this electrode 414. This voltage dither is used to compensate additional thermally induced index shifts as a result of the AM RF drive signal SRF_AM_M0 applied at the M0 electrode 410. The phasing of the dither signal SD_MP applied to this electrode 414 depends on the sign of the gain slope of the amplifier 434 and the type of MZM 400, either zero- or PI-phase shifted MZM 400. The correct phasing of the dither signal SD_MP (either in-phase or out-of-phase) and amplitude control is achieved through amplifier 444.

The logical flow of the control scheme is implemented at controller 426. Preferably, the controller 426 performs low-pass filtering and measures the amplitude of the frequency component of the input signal at $F_m$. Moreover, an error signal is used by the controller 426 to compute $\Delta I_{PH}$. In addition, S_POW is used by the controller 426 to compute the amplitude of SD_MP. These and other functions are described in more detail below.

The information-bearing RF signal SRF_AM_M0, which is amplitude modulated by signal SD_GA at 434, is injected to electrode M0 410, resulting in an amplitude on-off keying signal at the optical output 420 labeled as MZ_OUT_OPTICAL. As discussed before, the amplitude-modulated input signal SRF_AM_M0 results in a thermal index shift changing at a rate of $F_m$ Hz, as a consequence of optical absorption. This undesirable thermal index shift is compensated by the dither signal SD_MP, canceling any transfer function shifts and resulting in proper AM optical signals MZ_OUT_OPTICAL 420, TAP_OPTICAL 424 and at DATABAR_TAP 422.

The amplitude of the signal S_TAP at frequency $F_m$ is measured by the controller 426. S_TAP is generated by the photodetector 428 from either TAP_OPTICAL 424 or DATABAR_TAP 422. The controller 426 seeks to minimize S_TAP by changing the current $I_{PH}$ injected into the M0-phase electrode 412. This ensures that the MZM 400 always remains operating at a targeted point of the transfer function with desired transmitter characteristics.

Figure 5:
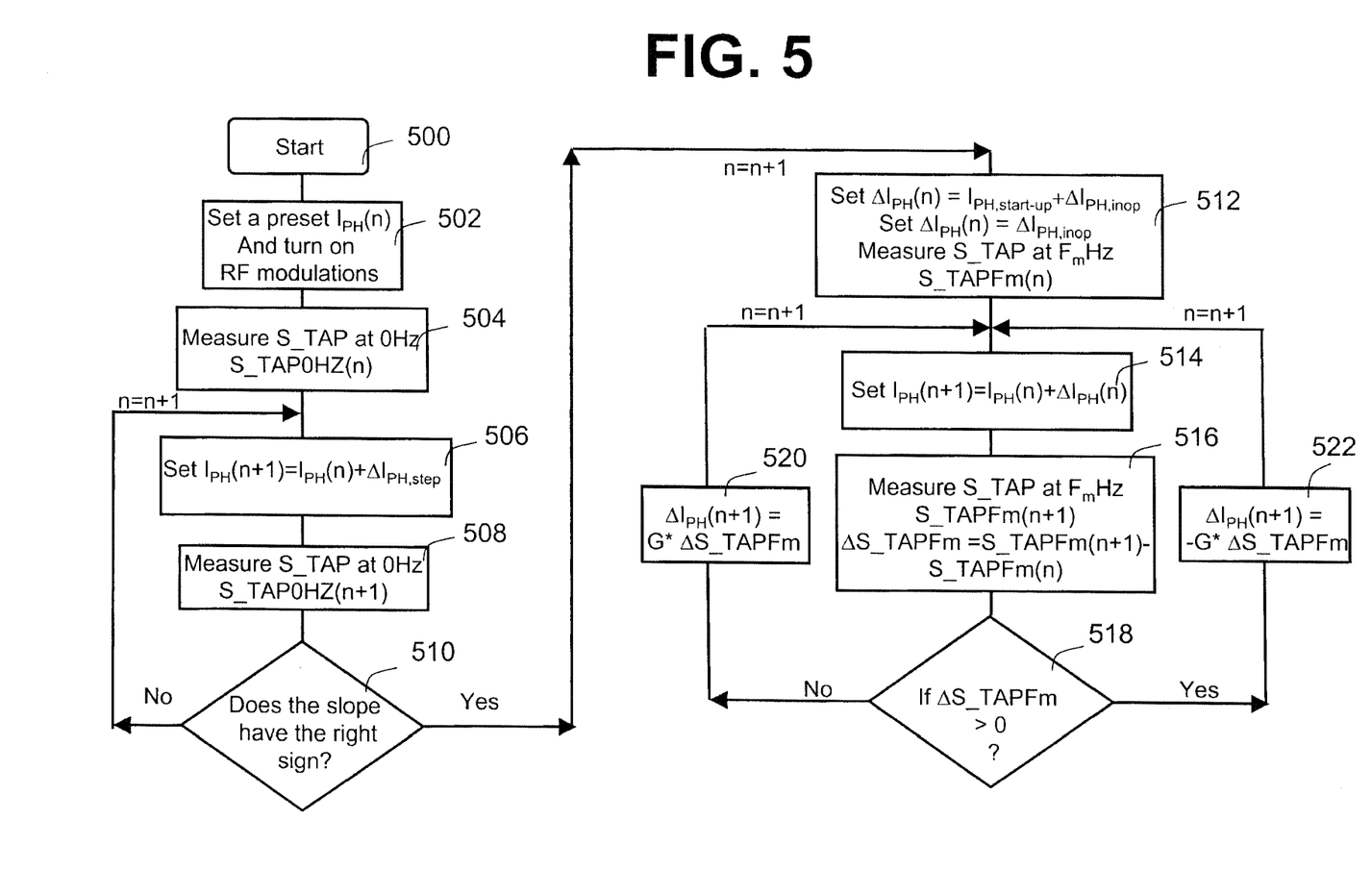
FIG. 5 is flowchart illustrating the steps or logic performed by a controller for controlling an operating set point of a Mach-Zehnder modulator.

FIG. 5 is flowchart illustrating the steps or logic performed by the controller 426 for controlling the MZM 400 operating set point. Blocks 500 to 510 represent the MZM control startup, while blocks 512 to 522 represent the MZM in-operation bias point control.

The startup routine is, in essence, a slope detection routine that sets an $I_{PH}$ value such that the required logical relation (inverted or non-inverted) between the electrical inputs and optical outputs is obtained. With the right output versus input polarity, the control scheme proceeds to the in-operation bias point control, which maintains the bias point at the targeted operating point by constantly minimizing the amplitude of the signal S_TAP at frequency $F_m$. The in-operation control scheme that generates the correction current $\Delta I_{PH}(n)$ can use either a synchronous or an asynchronous detection method. An asynchronous detection scheme is presented in blocks 512 to 522, and only minor modifications to the in-operation bias control and FIG. 4 are needed to adapt what is shown here in FIG. 4-FIG. 6 to a synchronous detection method.

Block 500 represents the start of the logic.

Block 502 represents the controller 426 setting $I_{PH}(n)$ to a preset value and turning on the RF modulation signal SRF_AM_M0.

Block 504 represents the controller 426 measuring S_TAP at 0 Hz and storing the value in S_TAP 0 HZ(n).

Block 506 represents the controller 426 setting $I_{PH}(n+1)$ to the following value:

$$I_{PH}(n+1)=I_{PH}(n)+\Delta I_{PH,Step}$$

where $\Delta I_{PH,Step}$ is the pre-determined current step for the startup routine.

Block 508 represents the controller 426 measuring S_TAP at 0 Hz and storing the value in S_TAP 0 HZ(n+1).

Block 510 is a decision block wherein the controller 426 determines if the current bias set point has the right logical relationship (non-inverted or inverted) between the input and output from measurements S_TAP 0 Hz(n) and S_TAP 0 Hz(n). In other words, Block 510 determines, from S_TAP 0 HZ(n+1) and S_TAP 0 HZ(n), whether the slope has the right sign. If not, n is incremented by 1 by the controller 426 and control transfers back to Block 506; otherwise, control transfers to Block 512.

Block 512 is the beginning of the in-operation bias control. This Block initializes $I_{PH}(n)$ and $\Delta I_{PH}$, respectively, to the following:

$$I_{PH}(n)=I_{PH,start-up}+\Delta I_{PH,in-op}$$

$$\Delta I_{PH}=\Delta I_{PH,in-op}$$

where $I_{PH,start-up}$ is the last value of $I_{PH}$ from the start-up routine and $\Delta I_{PH,in-op}$ is the pre-determined current step for the in-operation control. Upon setting the phase current to the M0-phase electrode 412, Block 512 also represents the controller 426 measuring S_TAP at $F_m$ Hz and storing the value in S_TAPFmHz(n).

Block 514 represents the controller 426 using $\Delta I_{PH}$ set in block 512 to update the $I_{PH}(n+1)$ to the following:

$$I_{PH}(n+1)=I_{PH}(n)+\Delta I_{PH}(n)$$

wherein the current source 432 is the set by the controller 426 to a new current of $I_{PH}(n+1)$.

Block 516 represents the controller 426 measuring S_TAP at $F_m$ Hz and storing the value in S_TAPFmHZ(n+1). This Block also represents the controller 426 setting $\Delta$S_TAPFmHZ to the following value:

$$\Delta S\_TAPFm=S\_TAPFm(n+1)-S\_TAPFm(n)$$

Block 518 is a decision block wherein the controller 426 determines whether $\Delta$S_TAPFm>0. If not, control transfers to Block 520; otherwise, control transfers to Block 522.

Block 520 represents the controller 426 setting $\Delta I_{PH}(n+1)$ to the following value:

$$\Delta I_{PH}(n+1)=G*\Delta S\_TAPFm$$

wherein G* is the in-operation loop gain, which is pre-determined so that a desired control loop performance, such as convergence time and amount of over-shoots, is obtained. The next update $\Delta I_{PH}(n+1)$ is obtained by multiplying the loop gain with the amplitude of $\Delta S\_TAPFm$.

Block 522 represents the controller 426 setting $\Delta I_{PH}(n+1)$ to the following value:

$$\Delta I_{PH}(n+1) = -G^* \Delta S\_TAPFm$$

Note that, in this case, the next update of $\Delta I_{PH}(n+1)$ is obtained by multiplying −1 to the product of loop gain G* and $\Delta S\_TAPFm$.

From both Blocks 520 and 522, n is incremented by 1 by the controller 426 and control transfers back to Block 514.

Figure 6:
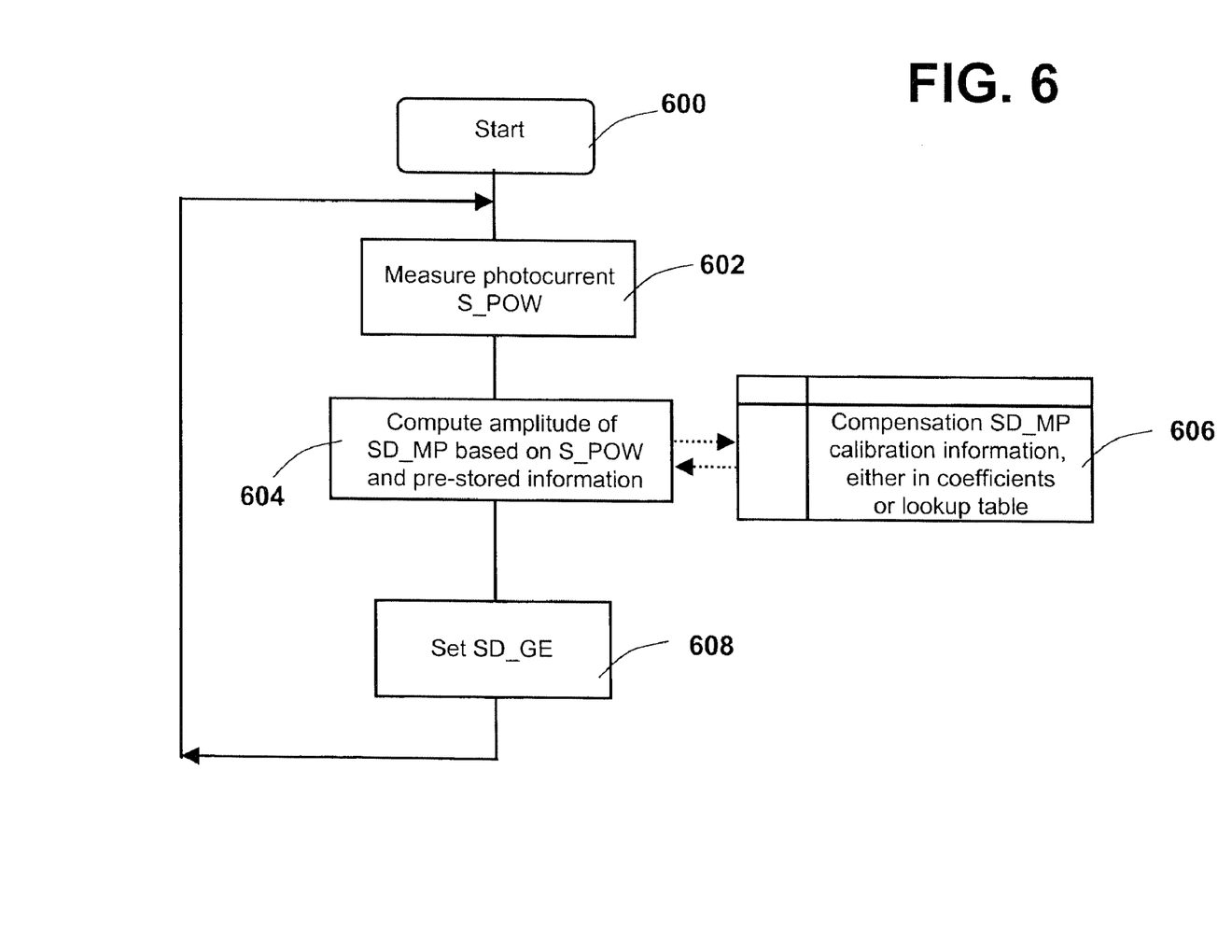
FIG. 6 is flowchart illustrating the steps or logic performed by a controller for controlling a compensation signal of a Mach-Zehnder modulator.

In addition to the start-up control and in-operation bias control shown in FIG. 5, the compensation signal amplitude control shown in FIG. 6 is also needed and carried out by controller 426 simultaneously. These two control processes (shown in FIG. 5 and FIG. 6) run independently of each other.

The amplitude control of dither signal changes the amplitude of dither signal SD_MP depending on the optical power levels, since the thermally induced index shift increases with increase in optical power which when absorbed, results in higher amount of photocurrent and dissipated heat. Optical power through the modulator arm 406 is measured using a photocurrent sense resistor 438 and amplifier 440, while bias tee inductor 442 applies a DC reverse bias to electrode 410. The amplified signal S_POW is then used by the controller 426 to compute the required amplitude of SD_GE into gain control of amplifier 444, such that SD_MP always cancels the thermal index shifts at different optical power levels.

FIG. 6 is a flowchart illustrating the control logic performed by the controller 426 for controlling the MZM 400 compensation signal SD_MP.

Block 600 represents the start of the control logic.

Block 602 represents the controller 426 measuring the photocurrent and storing the value in S_POW.

Block 604 represents the controller 426 computing the amplitude of SD_MP based on the S_POW value from block 602 and pre-stored information. Specifically, Block 606 represents the compensation SD_MP calibration information used by the controller 426, which is stored either as coefficients or as a lookup table.

Block 606 represents the controller 426 setting the value of SD_GE to achieve the desired amplitude of SD_MP for a given optical power level.

In addition to changing the SD_MP amplitude based on optical power, it can be deliberately scaled in such a way that a minimum S_TAP signal always occurs at a targeted point of the transfer function with desired transmitter characteristics. This is achieved by either over-compensating or under-compensating the thermally induced index shift. This technique also applies in the case of an MZM 400 where thermal effects are minimum, since by adjusting the dithering amplitude on the other arm 406 or 408 either enhances or decreases the out-of-phase AM signal at optical one and zero rails, thus allowing minimum S_TAP signal at any chosen operating point of the transfer function.

Figure 7:
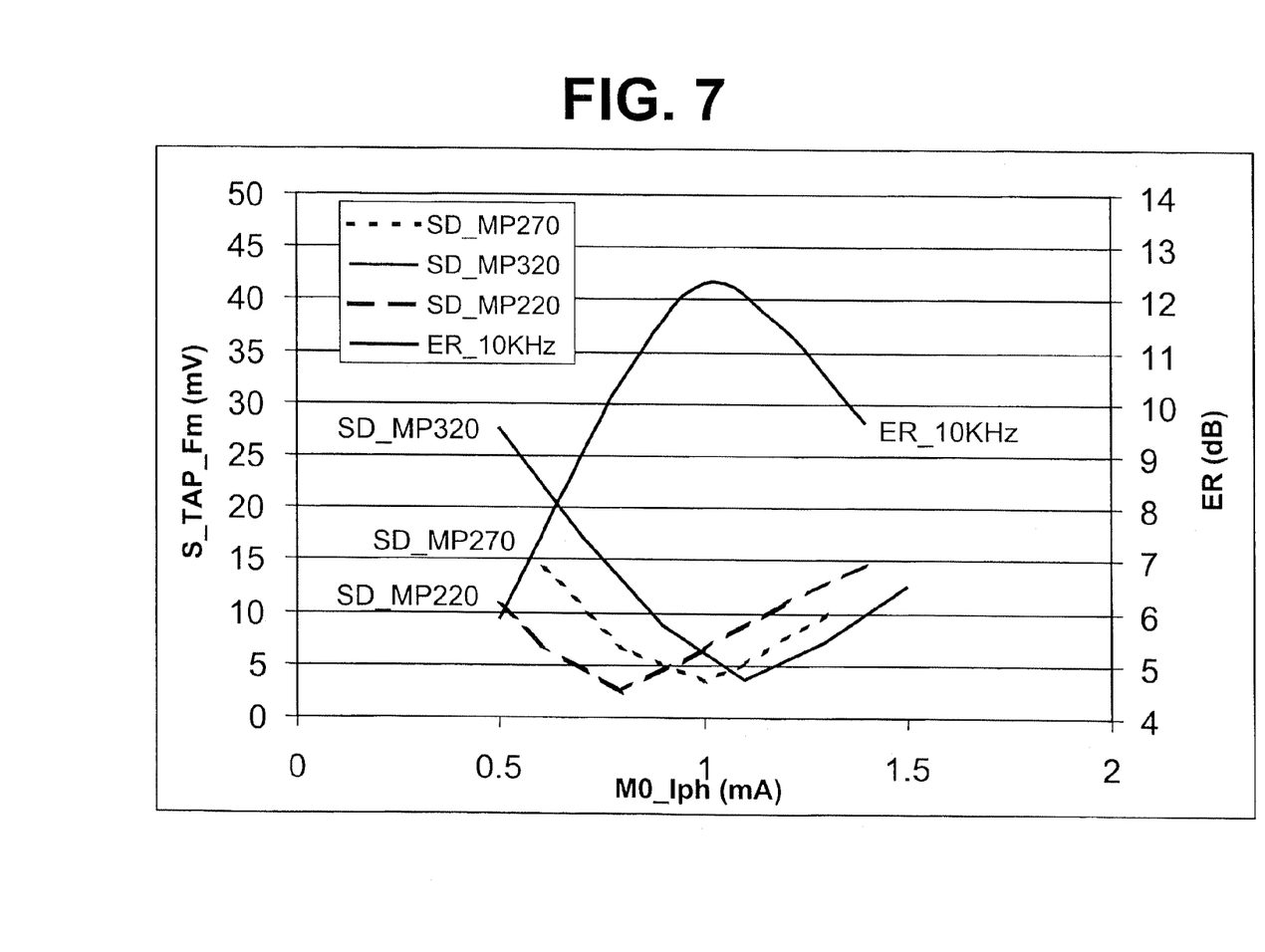
FIG. 7 shows an example of varying the amplitudes of the AC compensating signal to illustrate the principle of over-compensating and under compensating the thermally induced optical index shifts in order to bias the MZM by a controlled amount away from the point that would result in highest extinction ratio (right axis).

FIG. 7 shows the example of operating the semiconductor MZM at different extinction ratios (ER) when over compensating (SD_MP320) or under compensating (SD_MP220) the SD_MP. In the over- and under-compensating cases, the minimum of the $S\_TAP\_F_m$ signal in which the in-operation bias control seeks to minimize, no longer coincides with the maximum extinction ratio. This illustrates the possibility of using the SD_MP amplitude to intentionally bias the MZM to other operating points other than that would result in maximum extinction ratio.

REFERENCES

The following references are incorporated by reference herein:

[1] Yuliya Akulova, Greg Fish, Ping Koh, Peter Kozodoy, Mike Larson, Clint Schow, Eric Hall, Hugues Marchand, Patrick Abraham, Larry Coldren, "10 Gb/s Mach-Zehnder modulator integrated with widely-tunable sampled grating DBR laser," TuE4, OFC 2004.

[2] Xun Li; Huang, W.-P.; Adams, D. M.; Rolland, C.; Makino, T.; "Modeling and design of a DFB laser integrated with a Mach-Zehnder modulator," Quantum Electronics, IEEE Journal of, Volume 34, Issue 10, October 1998, pp. 1807-1815.

[3] Photonics Systems, Inc., "Modulator Bias Controller PSI 0202 Data Sheet."

[4] E. I. Ackerman, C. H. Cox, International Topical Meeting on Microwave Photonics, September 2000, pp. 121-124.

[5] Joseph P Farina, Scott Meritt, Gregory J. McBrien, "Bias Control for Digital Transmission using JDSU Uniphase External Modulators."

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for providing operating point control for a Mach-Zehnder modulator experiencing optical absorption at its interferometric arms, comprising:
a bias control circuit for generating compensation signals that are used to counter thermally induced index shifts as a result of the optical absorption, wherein said compensation signals comprise a first compensation signal that is a direct current (DC) compensation signal that compensates for an average of the thermally induced index shifts as a result of a DC component of an electrical input signal, and a second compensation signal that is an alternating current (AC) compensation signal that compensates for an instantaneous one of the thermally induced index shifts as a result of an amplitude modulation (AM) component of the electrical input signal.

2. The apparatus of claim 1, wherein an operating point with desirable transmitter characteristics is chosen for the Mach-Zehnder modulator so as to over-compensate or under-compensate thermal effects.

3. The apparatus of claim 1, wherein the AC compensation signal has identical frequency and is either in-phase or out-of-phase with the AM component of the electrical input signal.

4. The apparatus of claim 1, wherein the DC compensation signal is applied to a first arm of the MZM, while the AC compensation signal is a sinusoidal signal applied to the first arm or a second arm of the MZM.

5. The apparatus of claim 1, wherein the amplitude of the AC compensation signal is proportional to an average photocurrent produced in the first arm of the MZM.

6. A method for providing operating point control for a Mach-Zehnder modulator experiencing optical absorption at its interferometric arms, comprising:
generating compensation signals in a bias control circuit that are used to counter thermally induced index shifts as a result of the optical absorption, wherein said compensation signals comprise a first compensation signal that is a direct current (DC) compensation signal that compensates for an average of the thermally induced index shifts as a result of a DC component of an electrical input signal, and a second compensation signal that is an alternating current (AC) compensation signal that compensates for an instantaneous one of the thermally induced index shifts as a result of an amplitude modulation (AM) component of the electrical input signal.

7. The method of claim 6, wherein an operating point with desirable transmitter characteristics is chosen for the Mach-Zehnder modulator by over-compensating or under-compensating thermal effects.

8. The method of claim 6, wherein the AC compensation signal has identical frequency and is either in-phase or out-of-phase with the AM component of the electrical input.

9. The method of claim 6, wherein the DC compensation signal is applied to a first arm of the MZM, while the AC compensation signal is a sinusoidal signal applied to the first arm or a second arm of the MZM.

10. The method of claim 6, wherein the amplitude of the AC compensation signal is proportional to an average photocurrent produced in the first arm of the MZM.

11. An apparatus for modulating optical signals, comprising:
a Mach-Zehnder modulator that in operation experiences optical absorption in interferometric arms thereof; and,
a bias control circuit for providing operating point control for the Mach-Zehnder modulator by generating compensation signals that are used to counter thermally induced index shifts resulting from the optical absorption, wherein in operation the bias control circuit generates a first compensation signal that is a direct current (DC) compensation signal that compensates for an average of the thermally induced index shifts as a result of a DC component of an electrical input signal, and a second compensation signal that is an alternating current (AC) compensation signal that compensates for an instantaneous one of the thermally induced index shifts as a result of an amplitude modulation (AM) component of the electrical input signal.

12. The apparatus of claim 11, wherein an operating point with desirable transmitter characteristics is chosen for the Mach-Zehnder modulator by over-compensating or under-compensating thermal effects.

13. The apparatus of claim 11, wherein the AC compensation signal has identical frequency and is either in-phase or out-of-phase with the AM component of the electrical input.

14. The apparatus of claim 11, wherein the DC compensation signal is applied to a first arm of the MZM, while the AC compensation signal is a sinusoidal signal applied to the first arm or a second arm of the MZM.

15. The apparatus of claim 11, wherein the amplitude of the AC compensation signal is proportional to an average photocurrent produced in the first arm of the MZM.

16. The apparatus of claim 11, wherein the bias control circuit comprises:
a photocurrent measuring circuit for measuring a photocurrent in one of the interferometric arms of the Mach-Zehnder modulator; and,
a controller for controlling an amplitude of the AC compensation signal in dependence upon said photocurrent.

17. The apparatus of claim 16, further comprising a circuit element electrically coupled between the controller and the one of the interferometric arms of the Mach-Zehnder modulator for setting at least one of the amplitude and phase of the AC compensation signal in response to a control signal from the controller.

18. The apparatus of claim 1, wherein the bias control circuit comprises:
a photocurrent measuring circuit for measuring a photocurrent in an interferometric arm of the Mach-Zehnder modulator; and,
a control circuit for controlling an amplitude of the AC compensation signal in dependence upon said photocurrent.

19. The apparatus of claim 18, further comprising a circuit element electrically coupled between the controller and the one of the interferometric arms of the Mach-Zehnder modulator for setting at least one of the amplitude and phase of the AC compensation signal in response to a control signal from the controller.

20. The method of claim 6, comprising:
a) measuring a photocurrent in an interferometric arm of the Mach-Zehnder modulator; and,
b) controlling an amplitude of the AC compensation signal in dependence upon said photocurrent.

21. The method of claim 20, wherein step b) comprises using stored calibration information to set a proportionality constant between the photocurrent measured in step a) and the amplitude of the AC compensation signal.

22. The method of claim 21, wherein the proportionality constant is set for operating the Mach-Zehnder modulator away from a quadrature point of a transfer characteristic thereof.

* * * * *